June 4, 1963

G. W. BARNES 3,092,429

CHASSIS SLIDE MECHANISM

Filed May 23, 1960

INVENTOR:
George W. Barnes

By Marvin H. Kleinberg
Attorney

United States Patent Office 3,092,429
Patented June 4, 1963

3,092,429
CHASSIS SLIDE MECHANISM
George William Barnes, Inglewood, Calif., assignor to David Industries, a corporation of Nevada
Filed May 23, 1960, Ser. No. 31,180
6 Claims. (Cl. 312—333)

This invention relates to mounting mechanisms for electronic chassis and, more particularly, to an improved telescoping sliding mechanism which can be easily disassembled, for access to the chassis mounted thereon.

In present-day equipment in the electronic field, a standard rack is provided for the modular assembly of complex electronic equipment. The industry has agreed upon standards of height, width, and depth. A rack may contain several independent electronic units, each assembled on its own chassis yet interconnected to work as a single unit.

Frequently, it is necessary to remove an individual chassis for service and maintenance and, to this end, sliding mechanisms have been provided to enable the chassis to be withdrawn from the rack. The sliding mechanisms are of a telescoping type to save space and normally include an outer member which fastens to the rack, an inner member fastens to the chassis, and an intermediate member between the two.

The sliding mechanisms are required to support the weight of a relatively heavy electronic chassis and yet should slide easily. At the same time, the requirement is frequently imposed that the slide be capable of locking at the open extended position. Further, it should be possible to completely remove the chassis from the rack for service or replacement, and the sliding mechanism should be compatible with the innermost member of a slide assembly on the replacement chassis. The task of replacing the chassis on the mechanism should also be trouble free inasmuch as holding a heavy chassis does not permit the use of intricate devices requiring manual manipulation.

The history of sliding mechanisms is a rather extensive and crowded one and many mechanisms can be found in the prior art. However, slides today are of two general types, which could be broadly designated the roller slides and frictional slides. A typical roller slide is shown, for example, in the patent to Gussack, No. 2,655,422, issued October 13, 1953 and a typical frictional slide is found in the patent to Fall issued October 8, 1957; No. 2,809,085.

The present invention is directed to frictional slides which find great utility in supporting relatively light loads. However, the weight of a typical electronic chassis causes extensive binding in slides having either flat, bearing surfaces or slides that are not perfectly mated. Other problems are encountered in the locking assemblies of the prior art of the type having a button on a leaf spring mounted on the side of the slide member to engage an aperture in an adjacent member. During normal operation of the slide, the projecting button continuously bears against the adjacent member, causing frictional wear in addition to adding a resistance to sliding. The wear ultimately results in removing the protective finish of the adjacent member thereby permitting rust and corrosion.

In an attempt to alleviate these and other problems of the prior art, the present invention utilizes a slide arrangement of a type previously proposed and wherein the innermost slide member is supported on the edges of a single thickness of metal within a pair of nesting slides whose edges were turned over to provide a three-section telescoping slide. The thickness of the innermost member provides a small bearing surface satisfactory for light weight desk drawers but inadequate to support a relatively heavy electronic chassis which would exert extremely high pressures on the sliding surfaces, thereby making sliding movement difficult. Consequently, the prior art turned to more complex shapes and structures to increase the bearing surface without incurring a penalty in added size and bulk, but the fabricating techniques became complex and expensive.

According to the present invention, a support surface for the innermost member is created by bending the edge double to form a rounded surface and at the same time increasing the rigidity of the member. The middle and outer slides are then rounded to comparable radii which permits complete nesting, and yet all bearing surfaces are rounded to provide a maximum area of contact. This surface configuration coupled with the usage of the molybdenum disulphide dry lubricant, enables a freely sliding telescoping combination.

To avoid the difficulty of prior art slides of the frictional rubbing of a projecting member on an adjacent wall, the present invention provides a pair of spring loaded latching mechanisms one of which acts upon cooperating elements on an adjacent surface on the inner walls but which does not form a locking contact until actual engagement of the members. The other latching mechanism of a relatively "soft" material operates through apertures in the sliding surfaces to lock when the members are in the extended positions. During operation wearing contacts are minimized to reduce the possibility of corrosion. The slides can be positively locked in the extended position and, through actuation of a release mechanism, a chassis can be completely removed from the slides without requiring any manipulation. The chassis can be returned to the cabinet by engaging the innermost sliding members in the locked, extended intermediate members and merely sliding the drawer in until the latching mechanism is engaged and the assembly is locked in the extended position. Actuation of the release mechanism now permits the drawer to be closed and the second latching mechanism is automatically disengaged as the slides telescope to the closed position.

Accordingly, it is an object of the present invention to provide an improved chassis slide for electronic equipment, having round sliding surfaces.

It is a further object of invention to provide an electronic chassis slide that securely locks in the extended position.

A further object is to provide a telescoping chassis slide of increased rigidity yet is thinner than slides of the prior art.

It is a further object of invention to provide a slide that permits easy removal and replacement of the chassis.

It is still another object of the invention to provide a slide for an electronic chassis of stronger construction than the prior art without increased volume.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

Figures 1, 2:
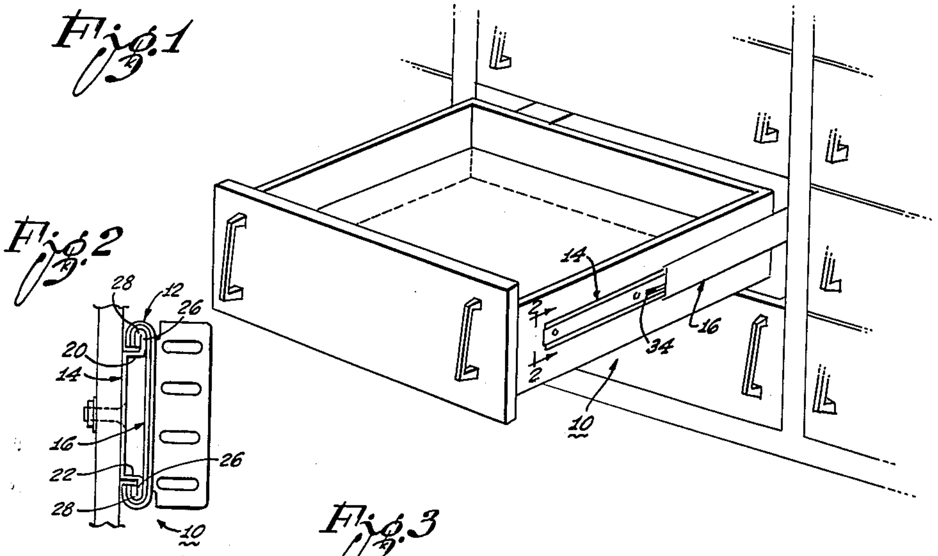
FIGURE 1 is a perspective view of an electronic chassis mounted upon an extended chassis slide according to the present invention.
FIGURE 2 is a cross-section view of the end of a telescoped chassis slide.

Turning now to FIGURE 1, there is shown a slide 10 according to the present invention which is made up of three telescoping members. An outer member 12 is adapted to fasten to the cabinet or rack, an inner member 14 is adpted to fasten to the chassis or drawer and an intermediate member 16 slides in the outer member 12 and houses the inner member 14. As is best seen in the cross section view of FIGURE 2, the inner member is formed preferably in a channel type construction. The parallel slide members 20, 22 are bent outward to form flanges in a plane parallel to the flat base 24, thereby forming a relatively rigid structure. For added structural rigidity, however, the edges are doubled back upon themselves to form a double thickness at the extremity 26, which presents a round external surface 28 without further processing. To achieve a similar shape, thickness and rigidity in a single width of material would obviously require a much heavier gauge material which would then be subjected to expensive grinding or milling operations to round the edges.

The intermediate member 16 is also formed from a single sheet of material of the same gauge as the inner member 14 and is substantially planar in shape with the ends bent over to an inner curvature of the innermost member 14. The intermediate member, when formed to shape, completely encloses the flange portions of the innermost member slidingly supported therein.

The outermost member 12 is substantially similar to the intermediate member 16 and is curved over at the ends to completely enclosure the intermediate member. When the three members are assembled they nest snugly within each other and the rounded surfaces provide a relatively large sliding area for more efficient weight distribution.

Figure 3:
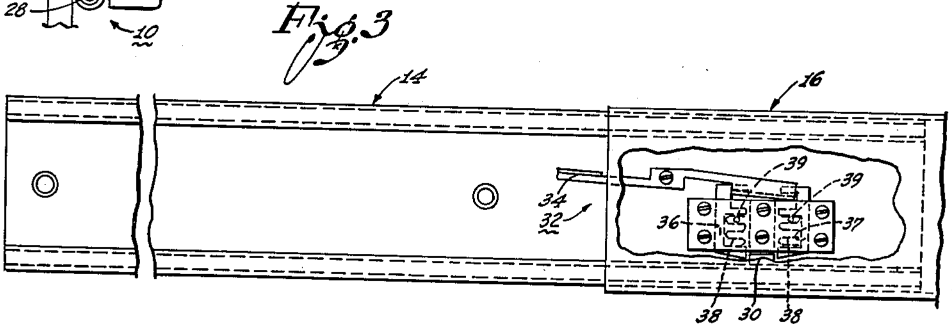
FIGURE 3 is a view of a portion of a slide, partly broken away to show extended position latch mechanism.

Turning next to FIGURE 3, there is shown in detail a latching mechanism for locking the innermost member 14 in the extended position. A substantially rectangular lug 30 is welded or fastened to the inner surface of the intermediate member 16 and extends into the space between the innermost and intermediate members. A first latching mechanism 32 is fastented to the opposing inner surface of the innermost member 14. The first latching mechanism 32 includes a release lever 34 and a pair of vertically moveably independent catches 36, 37 with wedged camming surfaces.

The release lever 34 is pivotably mounted on the inner surface and terminates in an L-shaped portion. The pair of independently moveable E-shaped catches 36, 37 are mounted with the open sides facing each other and the upper arm of each catch is supported by an inwardly bent portion of the release lever 34. The lower arm of each catch has a downwardly angled camming surface and a vertical inner surface. A pair of bias springs 38 are placed between eyelets 39 in the member 14, and the lower arms of each catch to bias the catches in the extended position. A cover plate 40 is placed over the assembly to keep the springs in place and to limit the motion of the catches to the vertical plane.

An encounter with the lug 30 on the adjacent member from either direction cams the encountered one of the catches upward. As the innermost slide 14 is extended, the lug 30, extending from the inner surface, strikes the camming surface of the first catch 36, pushing it upwards. The motion of the slide continues until the lug meets the vertical surface of second catch 37. The catches are spaced apart by the width of the lug so that when the lug reaches the second catch 37, the first catch 36 has cleared the lug 30 and is moved downward by its associated spring into its normal position. In the locked position, therefore, the lug 30 is trapped between the straight sides of the catches 36 and 37.

In order to release the lug 30 to permit sliding in either direction, the release lever 34 is actuated to raise both catches sufficiently high to clear the lug. The members are then free to slide relative to each other. The chassis may then be withdrawn from the rack or returned into the telescoped position. Obviously the lug 30 may approach the latch mechanism 32 from either direction and will be engaged automatically. The release lever 34 must be used to free the mechanism 32 once the lug 30 has been engaged.

Figure 4:
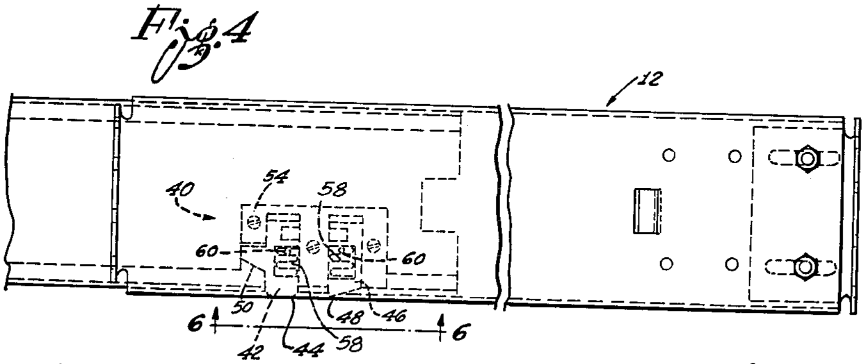
FIGURE 4 is a side view showing in detail the intermediate position latch mechanism.
Figure 5:
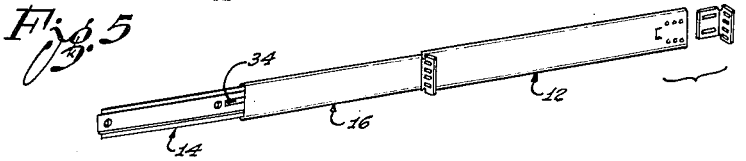
FIGURE 5 is a view of the slide in a fully extended position.
Figure 6:
FIGURE 6 is a bottom view of the slide of FIGURE 4 along line 6—6 in the direction of the appended arrows.

Turning next to FIGURE 4, there is shown in detail an intermediate latch assembly 40 which is substantially similar to the latch mechanism 32 but which operates in conjunction with the intermediate and outer slide member 16, 12. This mechanism is held inoperable by the outermost slide 12 bearing against it. When the intermediate slide is withdrawn, the mechanism latches to outermost member 12 by dropping a follower catch 42 into an aperture 44 which is a cutout portion of the channel. A second, dead-fall catch member 46 operates through a second aperture 48 and can engage the main aperture 44 if the follower catch 42 fails to operate. The follower catch 42 has a wedge type cam surface 50 adjacent to the innermost member 14 and is operated by the motion of the inner member 14 which raises and engages the cam 50 to wedge it upward, disengaging the follower. The dead-fall catch member 46 is substantially identical to the second catch 37 on the first latching mechanism. Therefore, inward movement causes the dead-fall latch member 46 to ride up out of the aperture 48.

The follower catch 42 substantially similar to the first catch 36 except that the bottom corners are rounded and the bottom surface is flattened. The second intermediate latch assembly 40 is also mounted between restraining wall member 54 and is constrained to move in the vertical plane. A pair of bias springs 58 between the lower ends of catches 42 and 46 and eyelets 60 in the wall, urge the follower catch 42 and the dead-fall catch 46 in the downward direction. The wedge cam portion 50 is placed in a position to engage the horizontal wall portion of the inner edge of the innermost member 14. When the intermediate latch is engaged, the catches 42, 46 extend through apertures in both the intermediate and outer slide members 16, 12. As the innermost member 14 is moved inward toward closure, the lower horizontal wall portions of the channel engages the cam 50 of the follower catch 42 forcing it upwards and out of the aperture 44. As the inner member 14 continues to move toward closure, the dead-fall catch member 46 rides out of its aperture 48 as intermediate member 16 begins sliding. The entire assembly then continues to slide until it is completely telescoped.

To review the operation of the entire slide mechanism 10 in a completely telescoped position, all members are free to slide upon each other. As the chassis is withdrawn from the rack, all of the slide members begin to extend. As soon as the innermost member 14 is extended slightly from the intermediate member 16, the intermediate latch assembly 40 is rendered operable and may engage the apertures 44, 48 of the outermost member 12 whenever they are encountered. Similarly, when the first latching mechanism 32 encounters the lug 30, it too will be engaged. There is no fixed order for the engagement or the latching of the mechanisms 32, 40 and they may be engaged in any sequence in a chassis withdrawal.

However, when a fully extended and locked chassis is returned to the cabinet, there is a definite sequence that is observed. First, the latching lever 34 must be operated to disengage the latch mechanism 32 from the lug 30, thereby releasing the inner slide member 14. The inner slide member 14 is then free to slide but the intermediate and outermost slide members 12, 16 are still locked. As the inner slide member 14 encounters the cam surface 50 of the intermediate latch assembly 40, the intermediate latch, too, is released and the intermediate member 16 is then free to slide in the outer member 12.

Thus there has been provided an improved chassis slide mechanism capable of supporting relatively heavy chassis assemblies weighing up to 220 pounds or more with relative ease. The slide, even in extended position, can support these loads without deformation or binding. The slides are locked when in the extended position and the lock can not be overridden. Further, in the extended locked position, the chassis can be withdrawn from the cabinet and replaced in the cabinet without the need of actuating entry mechanisms inasmuch as the latch between the innermost and intermediate members is self-energizing without regard for direction of movement. The levers must be actuated to either remove the chassis or to telescope close the chassis.

What is claimed as new is:

1. A slide mechanism for slidably supporting an electronic chassis in a rack, said slide mechanism comprising: an innermost slide member adapted to be fastened to an electronic chassis, said innermost member having a channel shape including a planar central wall portion with substantially co-planar upper and lower flange portions parallel to said planar central wall portion, said upper and lower flange portions being doubled upon themselves to present a substantially semicircular edge surface having a first radius of curvature; an intermediate slide member having a substantially planar central portion and having upper and lower edges inwardly curved to an inner radius of curvature substantially equal said first radius of curvature and having an outer semicircular edge surface with a second radius of curvature, said intermediate slide member being adapted to enclose said inner slide member in nesting sliding engagement with said central planar portions being spaced apart; first latching means fastened to said central portion of said innermost slide member facing said central portion of said intermediate slide member, said first latching means including a pair of first slideable catches and a releasing lever coupled thereto; a projecting lug mounted on said intermediate member central portion facing said innermost member and positioned to be engaged between said first slideable catches when said slide members are extended with respect to each other by a predetermined amount; an outermost slide member having a substantially planar central portion and having upper and lower edges inwardly curved to an inner radius of curvature substantially equal to said second radius of curvature, said outermost slide member being adapted to mount on an electronic equipment rack and being further adapted to enclose said intermediate slide member in nesting, sliding engagement; and second latching means mounted on said intermediate slide member, said second latching means including a slideable second catch, operable through an aperture in a curved edge of said intermediate slide member to engage an aperture in the adjacent curved edge of said outermost slide member when said intermediate and outermost slide members are extended by a predetermined amount with respect to each other, said second latching means including means operable in response to engagement by said innermost slide member for disengaging said outermost member aperture, whereby extending said outer and intermediate members by a predetermined amount locks said members with respect to each other until released by closure of said innermost slide member, and whereby said slide members telescope close to a nesting arrangement.

2. A telescoping mechanism for supporting an electronic chassis in an equipment rack comprising: an innermost member of channel shape adapted to be connected to an electronic chassis, said innermost member having a planar wall and substantially parallel and co-planar upper and lower flange portions doubled upon themselves to present a substantially semicircular edge profile having a first radius of curvature; an intermediate member having a substantially planar central wall portion and having upper and lower edges inwardly curved to an inner radius of curvature substantially equal to said first radius of curvature providing a substantially semicircular edge profile having a second radius of curvature; said intermediate member being adapted to slidingly enclose said inner member; first latching means fastened to said planar wall of said innermost member; a projecting lug on said intermediate member facing said innermost member and positioned to be engaged by said first latching means when said innermost and intermediate members are extended by a predetermined amount with respect to each other; an outermost member having a substantially planar central wall portion and having upper and lower edges inwardly curved to an inner radius of curvature substantially equal to said second radius of curvature, said outermost member being adapted to fasten to an electronic equipment rack and being further adapted to slidingly enclose said intermediate member, said outermost member having an aperture in one of said curved edges; and second latching means, mounted on said intermediate member and operable through an aperture in said intermediate member to engage said outermost member aperture when said intermediate and outermost members are extended a predetermined amount with respect to each other, said second latching means including means responsive to engagement by said innermost member for disengaging said outermost member aperture, whereby said members lock when extended to a predetermined position with respect to each other, and whereby said slide members slidingly telescope to a closed, nesting relationship.

3. A telescoping mechanism for slidably supporting an electronic chassis comprising: a first, innermost sliding member adapted to be fastened to an electronic chassis, said first member having a channel shape, including substantially parallel and co-planar upper and lower flange portions, said upper and lower flange portions being doubled upon themselves to present a substantially semicircular edge profile; a second, intermediate slide member having a substantially planar central portion and having upper and lower edges inwardly curved to an inner radius of curvature substantially equal to the radius of curvature of said semicircular edge profile of said first slide member, said intermediate slide member being adapted to enclose said inner slide member in close sliding engagement; first latching means, including a pair of independently engageable catches and a releasing lever fastened to the wall of said innermost slide member said releasing lever being coupled to said catches; a projecting lug on said second member positioned to be engaged by said latching means when said first and second slide members are extended by a predetermined amount with respect to each other; a third, outermost slide member having a substantially planar central portion and having upper and lower edges inwardly curved to an inner radius of curvature substantially equal to the radius of curvature of the outer surface of said second slide member, said outermost slide member being adapted to mount on an electronic equipment rack and being further adapted to enclose said second slide member in close sliding engagement; and second latching means, mounted on said second slide member for engaging an aperture in said third slide member when said second and third slide members are extended by a predetermined amount with respect to each other, said second latching means including means responsive to lengthwise movement of said first slide member for disengaging said second latching means, whereby said slide members when extended by a predetermined amount with respect to each other become locked, and whereby said slide members telescope closed in a nesting relationship.

4. A sliding track arrangement for supporting an electronic chassis in a rack mounting said arrangement including a pair of telescoping sliding mechanisms each comprising: an inner slide member adapted to be connected to the chassis; an outer slide member adapted to be connected to the rack; an intermediate slide member coupling said inner and outer slide members; first latching means mounted on said inner slide member and facing said intermediate slide member, comprising a pair of slideable first catches and a manually operable release lever positioned to slide said first catches, said intermediate slide member having a lug facing said inner slide member and positioned to be entrapped between said first catches when said inner slide member is extended with respect to said intermediate slide member; and second latching means mounted on said intermediate slide member and facing said inner slide member and including a second catch operable through apertures in said intermediate and outer slide members for locking said intermediate and outer slide members in an extended position with respect to each other, said second latching means including means responsive to closure of said inner slide member for disengaging said second catch from said outer member aperture; whereby withdrawal of the chassis from the rack locks all of said slide members in an extended position relative to each other, and whereby operation of said release lever permits closure of said inner slide member into said intermediate slide member, thereby permitting closure of said intermediate slide member into said outer slide member, said slide members telescoping to a nesting, closed position.

5. In a slide mechanism a latching device for locking two sliding members with respect to each other comprising: a lug on one of the members and latching means on the other of the members, said lug and latching means being attached to opposing inner surfaces, said latching means including a pair of slidable catches each independently operable to be cammed by engagement with said lug from one direction only, said catches being spaced apart to entrap said lug therebetween, said latching means further including a single manually operable release lever coupled to both of said catches for releasing said lug from entrapment.

6. The latching means of claim 5 above, wherein said latching means further includes means for biasing said catches into a lug-entrapping position.

References Cited in the file of this patent

UNITED STATES PATENTS

| | | |
|---|---|---|
| 728,087 | Deardorff | May 12, 1903 |
| 1,063,183 | Christian | June 3, 1913 |
| 1,071,006 | Little | Aug. 19, 1913 |
| 2,566,064 | Keim | Aug. 28, 1951 |
| 2,655,422 | Gussack | Oct. 13, 1953 |
| 2,750,244 | Manson | June 12, 1956 |
| 2,809,085 | Fall | Oct. 8, 1957 |
| 2,844,430 | Bogar | July 22, 1958 |
| 2,862,772 | Gussack | Dec. 2, 1958 |